(12) United States Patent
Nitzsche

(10) Patent No.: US 6,384,002 B1
(45) Date of Patent: May 7, 2002

(54) COMPOSITION AND METHOD FOR PURGING POLYMER PROCESSING EQUIPMENT

(75) Inventor: Norman E. Nitzsche, Willard, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 09/844,459

(22) Filed: Apr. 27, 2001

(51) Int. Cl.⁷ .............................. C11D 3/14; C11D 3/18
(52) U.S. Cl. .................. 510/188; 510/188; 510/193; 510/205; 510/395; 134/22.1; 134/22.11; 134/8; 264/39
(58) Field of Search ................... 510/188, 193, 510/205, 395; 134/22.1, 22.11, 8; 264/39

(56) References Cited

U.S. PATENT DOCUMENTS

| | | | |
|---|---|---|---|
| 2,952,888 A | 9/1960 | Cornelius | 25/156 |
| 3,764,362 A | 10/1973 | Hinley et al. | 106/300 |
| 3,778,288 A | 12/1973 | Ridge et al. | 106/308 |
| 3,844,810 A | 10/1974 | Pollard | 106/308 |
| 3,869,525 A | 3/1975 | Miller | 260/873 |
| 4,080,134 A | 3/1978 | Klaeysen et al. | 425/143 |
| 4,275,100 A | 6/1981 | Datta | 369/286 |
| 4,446,086 A | 5/1984 | Molenaar et al. | 264/118 |
| 4,789,321 A | 12/1988 | Dingus | 425/222 |
| 4,834,902 A | 5/1989 | Pioch et al. | 252/135 |
| 4,838,945 A | 6/1989 | Fujii et al. | 134/7 |
| 5,076,339 A | 12/1991 | Smith | 164/72 |
| 5,139,694 A | 8/1992 | Kmiec | 252/174.23 |
| 5,176,751 A | 1/1993 | Findley | 106/502 |
| 5,236,514 A | 8/1993 | Leung et al. | 134/22.14 |
| 5,256,185 A | 10/1993 | Semel et al. | 75/255 |
| 5,395,456 A * | 3/1995 | Abrams et al. | 134/22.14 |
| 5,424,012 A | 6/1995 | Ertle et al. | 264/39 |
| 5,443,768 A | 8/1995 | Scheibelhoffer et al. | 264/39 |
| 6,060,445 A | 5/2000 | Chandraker et al. | 510/475 |

FOREIGN PATENT DOCUMENTS

GB 2087787 A1 6/1982

OTHER PUBLICATIONS

"The Production of A–C Polyethylene Color Concentrates," Technical Data Brochure for Plastics, No. PLS–002, from Allied Corp., Morristown, NJ (undated) 3 pages.

"Series CL Laboratory Pellet Mills," from California Pellet Mill Company, Copyright 1987, 4 pages.

"Mineral Fillers in the Plastics Industry—A Review," Technical Note No. 184, from Polymers & Plastics, dated Aug. 26, 1999, 15 pages.

"Fillers and Reinforcing Agents in Plastics—Physical Chemical Aspects for the Processor," Technical Note No. 172, from Polymers & Plastics, dated Aug. 26, 1999, 14 pages.

* cited by examiner

Primary Examiner—Charles Boyer
(74) Attorney, Agent, or Firm—Joe A. Powell

(57) ABSTRACT

A composition and method purge resin deposits from the inner surfaces of polymer processing machinery upon the flow of a stream of resin through the polymer processing machinery. The composition includes a mixture of purging agents separate from the resin that are poured into the stream of resin as an additive. The purging agents include a blowing agent to induce foaming of the stream of resin and an abrasive to scrub the resin deposits from the inner surfaces of the polymer processing machinery. The purging agents further include a surfactant to promote the flow of the stream of resin along the inner surfaces of polymer processing machinery. A binder binds the purging agents together in the mixture. The method includes feeding a mixture comprised of a blowing agent, an abrasive, a surfactant, and a binder into the stream of resin entering the polymer processing equipment.

13 Claims, No Drawings

COMPOSITION AND METHOD FOR PURGING POLYMER PROCESSING EQUIPMENT

FIELD OF THE INVENTION

The present invention relates to removal of deposits from the inner surfaces of polymer processing machinery.

BACKGROUND OF THE INVENTION

Resin deposits can accumulate on the internal surfaces of resin processing machinery. It is sometimes desirable to purge these deposits from the internal surfaces. Purging agents are used for this purpose and generally act via chemical and/or abrasive action.

SUMMARY OF THE INVENTION

The present invention provides a composition for purging resin deposits from the inner surfaces of polymer processing machinery upon the flow of a stream of resin through the polymer processing machinery. The composition includes a mixture of purging agents separate from the resin in a state pourable into the stream of resin as an additive. The purging agents include a blowing agent effective to induce foaming of the stream of resin, and an abrasive effective to scrub the resin deposits from the inner surfaces of the polymer processing machinery. The purging agents further include a surfactant effective to promote the flow of the stream of resin along the inner surfaces of the polymer processing machinery. A binder binds the purging agents together in the mixture.

The present invention also provides a method for purging resin deposits from the inner surfaces of polymer processing machinery. The method includes feeding a mixture comprised of a blowing agent, an abrasive, a surfactant, and a binder into the stream of resin in the polymer processing equipment.

DESCRIPTION OF THE INVENTION

The invention is a purge composition, and a method of use, that enables resin deposits to be removed from the inner surfaces of polymer processing equipment. The purge composition is in a concentrate form and it is added directly to the stream of resin entering the polymer processing machinery. The purge composition functions by scrubbing old resin deposits and debris from the inner surfaces of the polymer processing machinery during a normal production cycle. Preferably, the purge composition is formulated to be most active over a temperature range that corresponds to the actual operating temperature range of the processing machinery. Three different formulations are described for the purge composition. The particular formulation chosen from these three formulations will depend upon whether the machinery is operating at low, standard, or high processing temperature ranges.

In a first embodiment, the purge composition is optimized for purging deposits from polymer processing equipment that is operating at low processing temperatures, such as about 400° F. or less. This first purge composition includes an endothermic blowing agent (also known as a foaming agent), an abrasive, a low melt temperature binder, and a surfactant. The formulation for this embodiment is shown in Table 1.

TABLE 1.

LOW TEMPERATURE PURGE COMPOSITION FORMULATION

| Purge Agent | Quantity in Formula (%) |
|---|---|
| MSOI Cenblo Mat 500 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Cerit 220 powder or equivalent hydroxy stearamide wax | 15 |
| Total | 100% |

The preferred blowing agent in the first embodiment is the commercial product MSO1 Cenblo Mat 500 available from Mats Corp Ltd. (Markham, Ontario, L3R Canada). MSO1 Cenblo Mat 500 is a carboxylic acid and carbonate based product. However, the formulation could include any other endothermic blowing agent which results in a purge composition which may be used to purge resin deposits as desired. Alternatively, a blowing agent could be prepared as a mixture of generic ingredients, such as a mixture of generic coated sodium bicarbonate and citric acid, or the like.

The abrasive in the first embodiment adds to the scrubbing action of the purge composition and also acts as a filler. The commercial product Omyacarb® FT available from Omya Inc. (Florence, Vt.) is the preferred abrasive in the first embodiment. Omyacarb® FT is a calcium carbonate based product. However, the formulation could include any other abrasive that would increase the scrubbing action of the purge composition for the removal of resin deposits. For example, another small particle calcium carbonate having an average particle size of not greater than about 1.5 microns can be substituted for the Omyacarb® FT. Preferably, the average particle size should be about 1.3 microns, as in the Omyacarb® FT product.

The preferred binder in the first embodiment is the commercial product Cerit 220 Powder available from E. W. Kaufman (Southamper, Pa.). Cerit 220 is a hydroxystearamide based product. A hydroxystearamide wax, or any other suitable alternative, can be substituted for the Cerit 220. Whichever binder is used, it should preferably be a low melt temperature binder which will release at approximately 220° F. The melted binder aids the incorporation of the purge composition into the melt flow of the resin.

The surfactant in the first embodiment is mineral oil. However, any suitable surfactant having the ability to coat or wet out the inner surfaces of the polymer processing machinery can be substituted.

In a second embodiment, the purge composition has a more effective scrubbing action at standard processing temperatures, such as within the range of about 400° F.–500° F., whereas in the first embodiment the first composition exhibits a more effective scrubbing action at lower processing temperatures. The formulation of the second purge composition includes the same abrasives and surfactants as those included in the formulation of the first purge composition. However, the second formulation differs from the first in that the endothermic blowing agent and the binder are more appropriate for use at standard processing temperatures. The formulation for this embodiment is shown in Table 2.

TABLE 2.

STANDARD TEMPERATURE
PURGE COMPOSITION FORMULATION

| Purge Agent | Quantity in Formula (%) |
|---|---|
| MSO1 Cenblo Mat 100 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Advawax ® 280 or equivalent ethylene bis stearamide wax | 15 |
| Total | 100% |

The preferred blowing agent in the second embodiment is the commercial product MSO1 Cenblo Mat 100 available from Mats Corp Ltd. (Markham, Ontario, L3R Canada). MSO1 Cenblo Mat 100 is a carboxylic acid and carbonate based product. However, any other endothermic blowing agent could be included in the composition as long as it results in a purge formulation capable of being used to purge resin deposits as desired. For example, a blowing agent could be prepared as a mixture of generic ingredients, such as a mixture of coated sodium bicarbonate and citric acid or the like, at a ratio effective for standard processing temperatures.

The preferred binder in the standard temperature purge composition is the commercial product Advawax® 280 available from Rohm & Haas Co. (Cincinnati, Ohio). Advawax® 280 is an N, N ethylene bis(stearamide) based product. However, an ethylene bis stearamide wax, or any other suitable alternative, can be substituted. The binder should be a low melt temperature binder which will release at approximately 280° F., thereby aiding the incorporation of the purge composition into the melt flow of the stream of resin.

The ratio of endothermic blowing agent to abrasive in both the first and second purge composition formulations is optimized to achieve a maximum scrubbing action. This optimized ratio is preferably within the range from about 1.5:1 to about 2:1.

In a third embodiment, the purge composition has a more effective scrubbing action at high processing temperatures, such as about 500° F. or higher, whereas the first and second purge compositions are more effective at low and standard processing temperatures, respectively. The third composition uses the same abrasives and surfactants as those listed for the first and second compositions. However, the third composition differs from both of the previous compositions in that it preferably uses an exothermic blowing agent and a binder that are appropriate for use at high processing temperatures. The formulation for this embodiment is shown in Table 3.

TABLE 3.

HIGH TEMPERATURE
PURGE COMPOSITION FORMULATION

| Purge Agent | Quantity in Formula (%) |
|---|---|
| Expandex ® 5 PT or equivalent exothermic blowing agent (5-Phenyl tetrazole based chemistry) | 40 |
| Omyacarb ® FT or equivalent small particle calcium carbonate | 43 |
| Mineral Oil or equivalent surfactant | 2 |
| Advawax ® 280 or equivalent ethylene bis stearamide wax | 15 |
| Total | 100% |

The preferred blowing agent in the third embodiment is the commercial product Expandex® 5 PT available from Uniroyal Chemical Company, Inc. (Middlebury, Conn.). Expandex® 5 PT is a 5-phenyl tetrazole based product. However, the composition could include any other exothermic blowing agent which results in a purge composition which may be used to purge resin deposits as desired. The action of the exothermic blowing agent will preferably be based on 5-Phenyltetrazole chemistry. Alternatively, other high temperature formulations might use an endothermic blowing agent, such as Mat 201 or Mat 101 (Mats Corp Ltd., Markham, Ontario, L3R Canada), as long as the endothermic blowing agent results in a desired level of resin deposit removal at these high temperatures. Mat 201 and Mat 101 are chemical blends of polycarbonic acids, inorganic carbonates, and stearates.

In its most preferred embodiment, the formulation for the third purge composition has an optimal ratio of exothermic blowing agent to abrasive that results in maximum scrubbing action at high temperatures. This ratio is most preferably about 1:1. The average particle size of the abrasive is the same as that noted for use in the previous formulations.

The preferred binder of the high temperature purge composition is the commercially available product Advawax® 280 (Rohm & Haas Co., Cincinnati, Ohio). Advawax® 280 is an N, N ethylene bis(stearamide) based product. However, an ethylene bis stearamide wax, or any other suitable alternative, can be substituted. The binder should be a low melt temperature binder which will release at approximately 280° F.

The present invention further provides a method for purging resin deposits from the inner surfaces of polymer processing machinery. The method includes feeding a mixture comprised of a foaming agent, an abrasive, a surfactant, and a binder into the stream of resin in the polymer processing equipment. The mixture is poured from a container directly into a hopper of the polymer processing equipment and is added directly to the stream of resin moving through the barrel of the processing equipment. As the die and other tooling surfaces are thus Be cleaned in accordance with the invention, the resulting molded articles may have undesirable ingredients attributable to the purge composition. Some of these articles may be recycled in the same or a compatible stream of resin.

As the purge concentrate mixes with the stream of resin, the mixture is heated as it moves along the barrel of the machinery. The binder that holds the components of the purge composition together then melts into the stream of resin, thereby releasing the individual components of the composition into the stream of resin. Incorporation of the purge composition into the melt flow is additionally aided by the presence of the melted binder.

The blowing agent begins to degrade when it reaches the appropriate elevated temperature within the processing machinery. This degradation results in the production of gas bubbles within the melt flow. As the quantity of gas increases within the resin/purge composition mixture, the volume of the mixture expands. The subsequent increase in pressure which results from the expansion of the mixture against the inner surfaces of the machinery causes an increase in the scrubbing action of the mixture which aids in the removal of resin deposits.

The abrasive component of the purge composition is released along with the blowing agent as the binder melts into the stream of resin. Additional scrubbing action is added by the abrasive to the resin mixture, and the abrasive additionally functions as sites of nucleation for the newly forming gas bubbles produced by the degradation of the blowing agent. The small size of the abrasive particles, i.e., less than 1.5 microns, increases the number of potential nucleation sites which results in a more even distribution of the gas bubbles within the melt flow. An even dispersion of the gas within the stream of resin helps to improve the scrubbing action of do 17=the purge concentrate along the inner surfaces of the processing machinery. The processing machinery containing the purge composition is operated until the molded composition exiting the machine appears clean, thereby indicating that the internal parts of the machine are clean.

As mentioned above, the normal ratio of endothermic blowing agent to filler is preferably within the range from about 1.5:1 to about 2:1. This same ratio is used for both the low and standard temperature purge compositions. However, the ratio of exothermic blowing agent to filler used in the high temperature purge composition is preferably about 1:1. These ratios are chosen based upon the amount of gas produced by the particular blowing agent employed. More specifically, the exothermic chemistry involved in the degradation of the exothermic blowing agent typically generates 3 to 5 times the amount of gas produced by the endothermic chemistry associated with the degradation of the endothermic blowing agent. Therefore, due to the greater amount of gas generated by the exothermic agent, less blowing agent is required to achieve sufficient gas production.

In accordance with another feature of the invention, the performance of the purge composition may be affected by the ratio of purge concentrate to resin. The recommended starting ratio of purge concentrate added to the stream of resin is within the range of about 1 to about 25. For example, about 4 pounds of purge concentrate could be added to about 100 pounds of the stream of resin during the purging operation. However, higher amounts of purge concentrate could be added to the stream of resin, such as about 1 pound of purge concentrate to 10 pounds of the stream of resin, depending on the level of scrubbing the operator decides is required for sufficient cleaning of the machinery.

Although preferred embodiments of the invention have been shown and described, it should be understood that various modifications and substitutions, as well as rearrangements and combinations, can be made by those skilled in the art, without departing from the spirit and scope of this invention.

What is claimed is:

1. A composition for purging resin deposits from the inner surfaces of polymer processing machinery upon the flow of a stream of resin through the polymer processing machinery, said composition comprising:

a mixture of purging agents separate from the resin in a state pourable into the resin as an additive;

said purging agents including a blowing agent effective to induce foaming of the stream of resin said blowing agent selected from the group consisting of an exothermic or an endothermic blowing agent an abrasive effective to scrub the resin deposits from the inner surfaces of the polymer processing machinery, and a surfactant effective to promote the flow of the stream of resin along the inner surfaces of polymer processing machinery; and a binder that binds said purging agents together in said mixture, selected from the group consisting of hydroxy stearamide wax, and ethylene bis stearamide wax.

2. A composition as defined in claim 1 wherein said blowing agent is a mixture of coated sodium bicarbonate and citric acid.

3. A composition as defined in claim 1 wherein said abrasive is calcium carbonate.

4. A composition as defined in claim 1 wherein said abrasive includes particles with a diameter not greater than about 1.5 microns.

5. A composition as defined in claim 1 wherein said surfactant is mineral oil.

6. A composition as defined in claim 1 wherein said composition is in a pelletized form.

7. A composition as defined in claim 1 wherein the ratio of said endothermic blowing agent to said abrasive is within the range from about 1.5:1 to about 2:1.

8. A composition as defined in claim 1 wherein the ratio of said exothermic blowing agent to said abrasive is about 1:1.

9. A method for purging resin deposits from the inner surfaces of polymer processing equipment, said method comprising:

feeding the composition of claim 1 into a stream of resin in said polymer processing equipment.

10. A method as defined in claim 9 wherein said mixture is poured in a liquid form from a container into said stream of resin.

11. A method as defined in claim 9 wherein said mixture is poured in a pelletized form from a container into said stream of resin.

12. A method as defined in claim 9 wherein the polymer processing equipment includes a die for shaping molded articles, and said method further comprises the step of forming the molded articles upon the passage of said stream of resin through said die following said feeding step.

13. A method as defined in claim 12 further comprising the step of recycling said molded articles in the same or a compatible stream of resin.

* * * * *